US010071797B2

(12) United States Patent
Guering et al.

(10) Patent No.: US 10,071,797 B2
(45) Date of Patent: Sep. 11, 2018

(54) AIRCRAFT HAVING A SIMPLIFIED GENERAL SECTION

(71) Applicant: Airbus Operations (SAS), Toulouse (FR)

(72) Inventors: Bernard Guering, Montrabe (FR); Laurent Saint-Marc, Montaigut sur Save (FR)

(73) Assignee: Airbus Operations (SAS), Toulouse (FR)

( * ) Notice: Subject to any disclaimer, the term of this patent is extended or adjusted under 35 U.S.C. 154(b) by 191 days.

(21) Appl. No.: 15/133,758

(22) Filed: Apr. 20, 2016

(65) Prior Publication Data
US 2016/0304186 A1    Oct. 20, 2016

(30) Foreign Application Priority Data
Apr. 20, 2015   (FR) ...................................... 15 53507

(51) Int. Cl.
| | |
|---|---|
| *B64C 1/18* | (2006.01) |
| *B64C 1/20* | (2006.01) |
| *B64C 5/02* | (2006.01) |
| *B64C 25/04* | (2006.01) |
| *B64D 11/04* | (2006.01) |
| *B64D 11/06* | (2006.01) |
| *B64D 27/02* | (2006.01) |

(52) U.S. Cl.
CPC .................. *B64C 1/20* (2013.01); *B64C 1/18* (2013.01); *B64C 5/02* (2013.01); *B64C 25/04* (2013.01); *B64D 11/04* (2013.01); *B64D 11/0696* (2013.01); *B64D 27/02* (2013.01)

(58) Field of Classification Search
CPC .. B64C 1/20; B64C 1/18; B64C 27/02; B64C 25/04; B64C 5/02; B64D 11/0696; B64D 11/04; B64D 27/02
See application file for complete search history.

(56) References Cited

U.S. PATENT DOCUMENTS 8,376,275 B2 *  2/2013  Bolukbasi ............... B64C 1/062
                                              244/119
9,505,354 B2 * 11/2016  Koncz ..................... B60R 11/00
(Continued)

FOREIGN PATENT DOCUMENTS

| FR | 2941437 | 7/2010 | |
|---|---|---|---|
| FR | 2941437 A1 * | 7/2010 | ............... B64C 1/18 |
| FR | 3000031 | 6/2014 | |

OTHER PUBLICATIONS

French Search Report, Feb. 9, 2016, priority document.

*Primary Examiner* — Valentina Xavier
(74) *Attorney, Agent, or Firm* — Greer, Burns & Crain, Ltd.

(57) ABSTRACT

An aircraft comprising a fuselage which has a central part with a cross section of constant geometry which comprises a floor. The floor comprises two lateral portions which are fixed respectively to two opposite lateral edges of the fuselage and which enclose a central portion to which they are fixed. One of the lateral floor portions is fixed to the central portion so as to allow a relative lateral movement between the two portions in the event of a modification in pressure inside the fuselage. The cross section thus deforms homogeneously when the fuselage is pressurized and the floor is not involved in maintaining the shape of the fuselage.

14 Claims, 6 Drawing Sheets

(56) References Cited

U.S. PATENT DOCUMENTS

| | | | | |
|---|---|---|---|---|
| 2008/0093503 | A1* | 4/2008 | Cacciaguerra | B64C 1/061 244/119 |
| 2009/0206202 | A1* | 8/2009 | Bolukbasi | B64C 1/062 244/121 |
| 2010/0044510 | A1* | 2/2010 | Schroeer | B64C 1/06 244/119 |
| 2010/0181426 | A1* | 7/2010 | Haack | B64C 1/068 244/119 |
| 2010/0213315 | A1* | 8/2010 | Marpinard | B64C 1/18 244/119 |
| 2012/0074259 | A1* | 3/2012 | Demont | B64C 1/18 244/118.6 |
| 2013/0306794 | A1* | 11/2013 | Zahlen | B64C 1/068 244/118.5 |
| 2014/0175223 | A1* | 6/2014 | Durand | B64C 1/068 244/119 |
| 2014/0175226 | A1* | 6/2014 | Durand | B64D 43/00 244/120 |

* cited by examiner

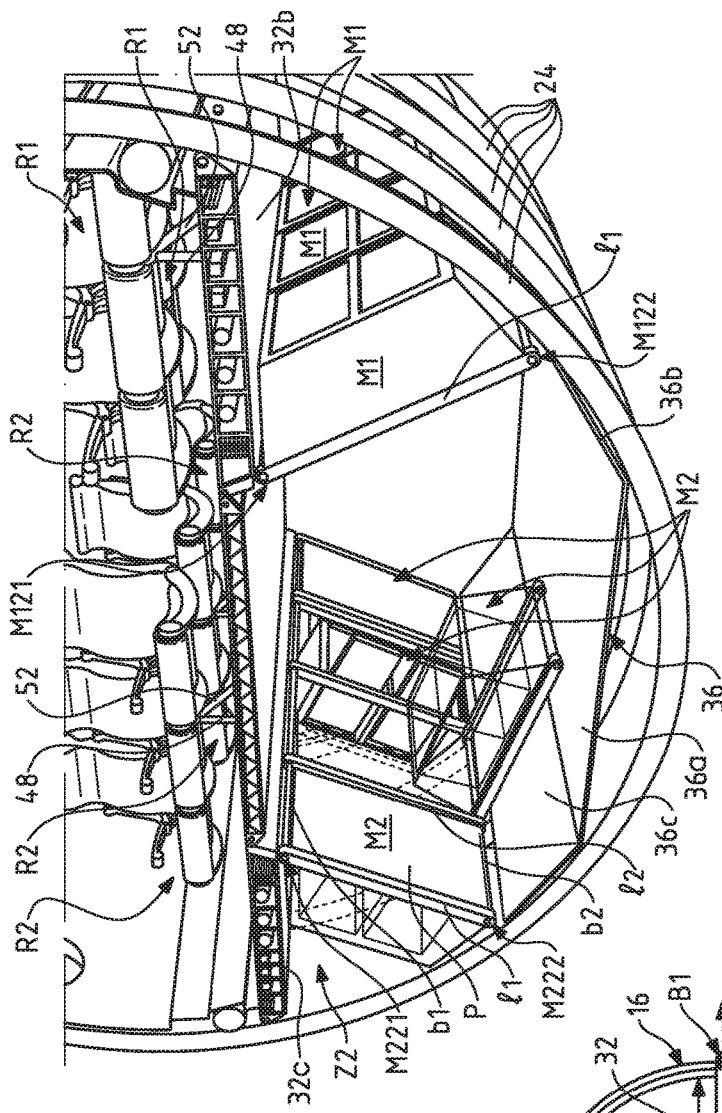
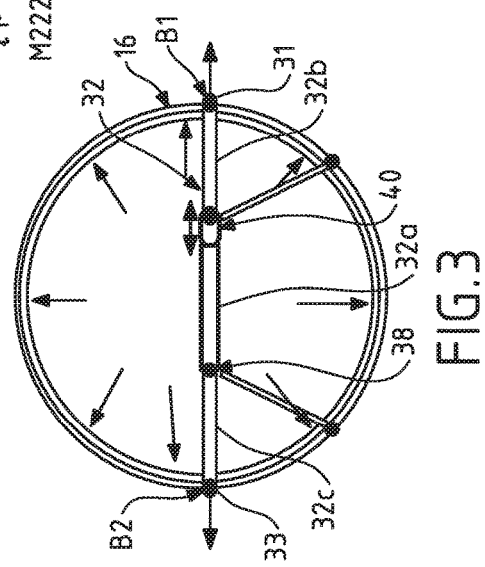

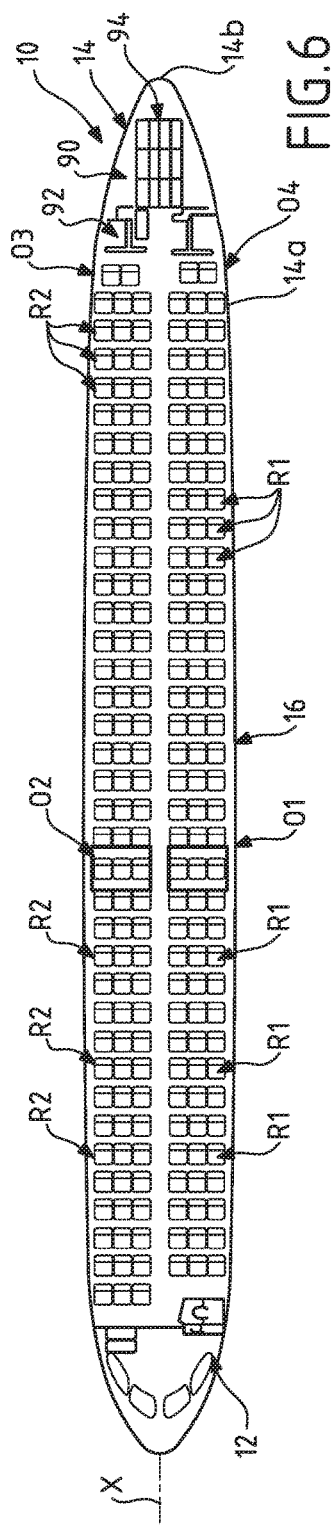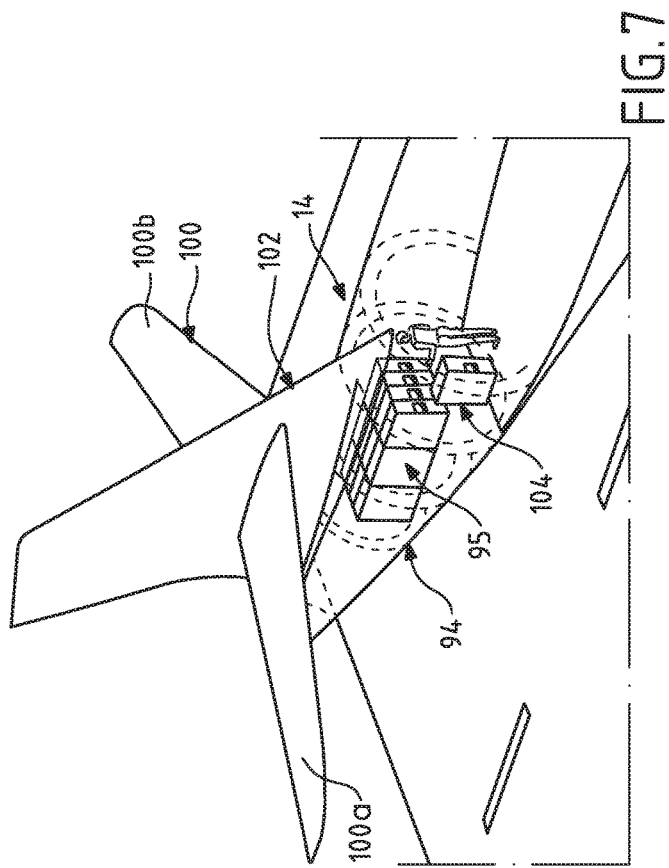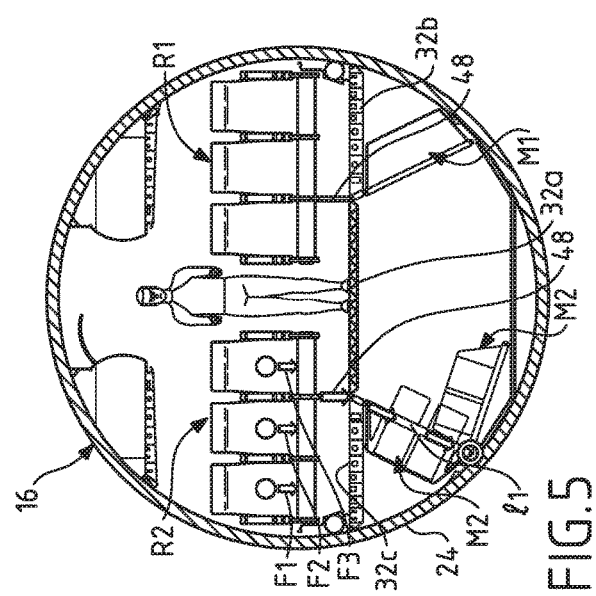

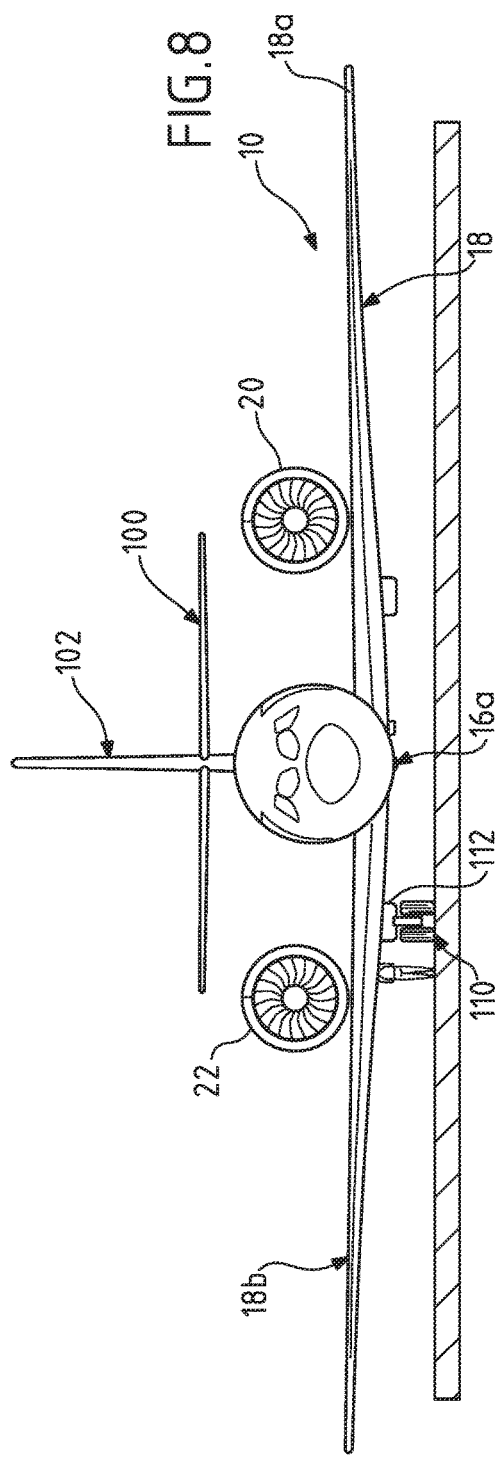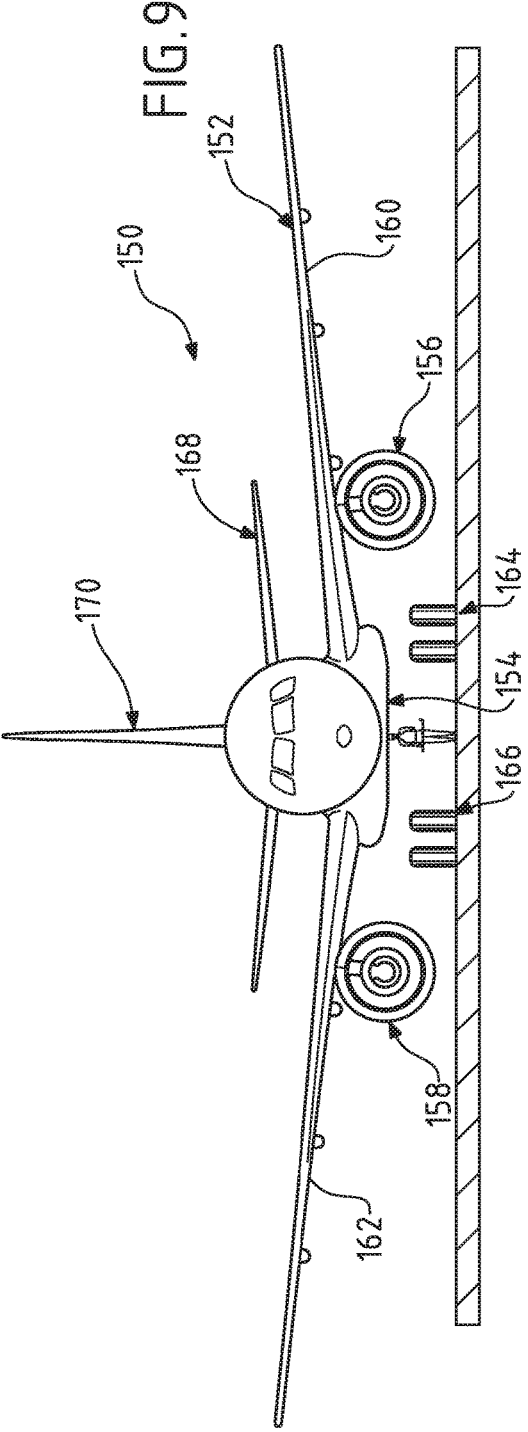

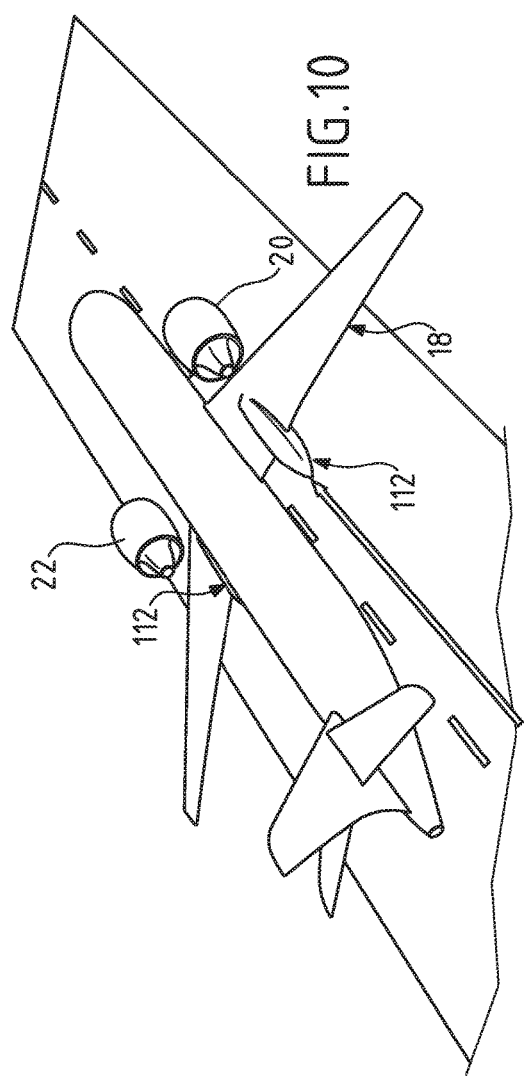
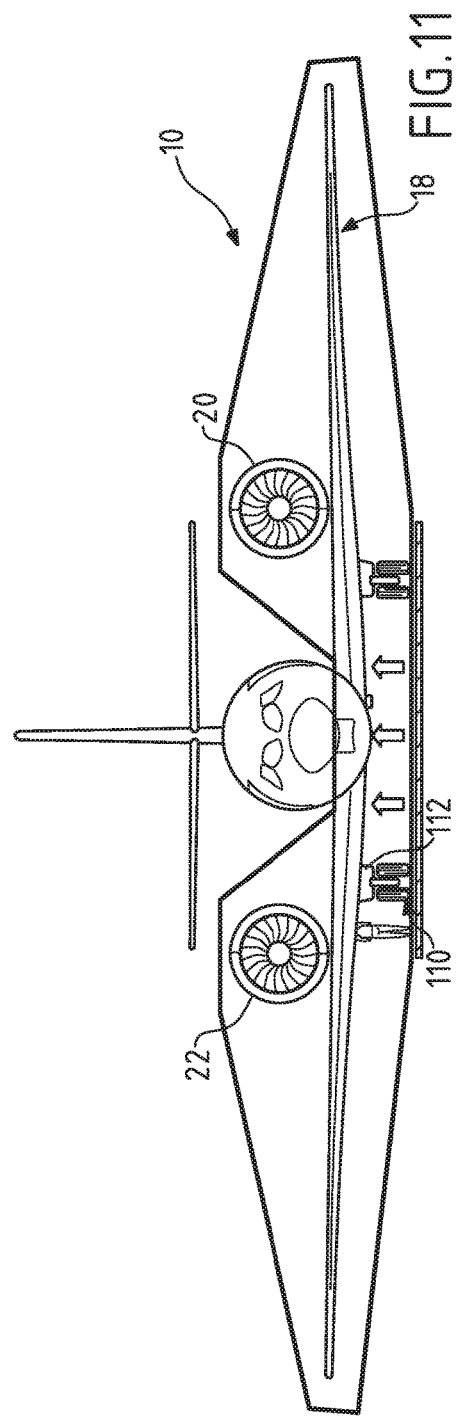

AIRCRAFT HAVING A SIMPLIFIED GENERAL SECTION

CROSS-REFERENCES TO RELATED APPLICATIONS

This application claims the benefit of the French patent application No. 1553507 filed on Apr. 20, 2015, the entire disclosures of which are incorporated herein by way of reference.

BACKGROUND OF THE INVENTION

The invention relates to an aircraft comprising a central part with a cross section of constant geometry.

Conventionally, aircraft comprise a fuselage which is formed, successively, of the following elements arranged along a longitudinal axis of the aircraft, specifically a nose, a central part with a constant cross section (termed "general section") and a tail.

In the majority of commercial aircraft, the cross section of the central part has a complex shape, the purpose of which is, in particular, to optimize the habitability of the internal space in order to accommodate the greatest possible number of passengers in economy class, and to offer more habitable space in the upper classes.

In some commercial aircraft, the complex shape is a four-lobed shape.

In order to avoid non-homogeneous deformation when the interior of the general section is pressurized, the four-lobed shape of the fuselage is maintained by a structural floor which connects the two opposite edges of the fuselage and which takes up the forces transmitted to the fuselage when it is pressurized ("active" floor).

In light of the above, it would be interesting to propose a simplified architecture for an aircraft general section.

SUMMARY OF THE INVENTION

The invention thus relates to an aircraft comprising a fuselage which has a central part with a cross section of constant geometry and which comprises a floor, wherein the floor comprises two lateral portions which are fixed respectively to two opposite lateral edges of the fuselage and which enclose a central portion to which they are fixed, one of the lateral floor portions being fixed to the central portion so as to allow a relative lateral movement between the two portions in the event of a modification in pressure inside the fuselage.

The constant-geometry cross section is stable when the fuselage is pressurized (that is to say that it deforms homogeneously) and therefore the floor need not be "active," that is to say that it is not involved in maintaining the shape of the fuselage. Transverse freedom of movement is moreover provided between the floor portions so as to not mechanically load the central portion when the diameter of the fuselage increases due to the increase in pressure.

According to other possible features, considered in isolation or in combination with one another:
- the fuselage comprises, arranged in succession along a longitudinal axis of the aircraft, a nose, the central part with a cross section of constant geometry and a tail, the nose and the tail being each of non-constant cross section;
- the central part has a circular cross section;
- the aircraft comprises, for each lateral floor portion, arranged along the longitudinal axis of the aircraft, a plurality of force-transmitting elements which extend between each lateral floor portion and the fuselage, each force-transmitting element extending obliquely from one of the ends of a lateral floor portion fixed to the central floor portion to a lower edge of the fuselage located beneath the lateral floor portion and set back with respect to the projection formed by the end of said lateral floor portion.
- the aircraft comprises, above each lateral floor portion, a plurality of rows of passenger seats, the passenger seats of each row being mounted on a common tube whose longitudinal extent is parallel to the floor, the tube being itself fixed to the corresponding lateral floor portion by a single foot;
- the single foot of each row of passenger seats is fixed at the end of the lateral floor portion which is fixed to the central floor portion so as to transmit the vertical forces passing through said foot through the force-transmitting elements located beneath the floor;
- the central part is reserved for receiving passenger seats;
- the aircraft comprises, integrated into the lateral floor portions so as to extend longitudinally in the central part of the aircraft, bundles of electric cables and air supply and removal ducts.

BRIEF DESCRIPTION OF THE DRAWINGS

Other features and advantages will emerge from the following description, which is provided solely by way of non-limiting example and makes reference to the appended drawings, in which:

FIG. 3 is a reduced, simplified schematic view from FIG. 2;

FIG. 4 is a partial perspective schematic view of the cargo hold from FIG. 2;

FIG. 5 is a reduced schematic view from FIG. 2;

FIG. 6 is a schematic view in longitudinal section from above, showing the internal arrangement of the aircraft from FIG. 1;

FIG. 7 is a partial perspective schematic view of the interior of the tail shown in FIG. 6;

FIGS. 8 and 9 are, respectively, schematic front views of a novel aircraft configuration according to one embodiment of the invention and of a conventional aircraft configuration;

FIG. 10 is a perspective schematic rear view of the aircraft from FIG. 1;

FIG. 11 is a schematic front view showing an integral module of the novel aircraft configuration from FIG. 8.

DETAILED DESCRIPTION OF THE PREFERRED EMBODIMENTS

Figure 1:
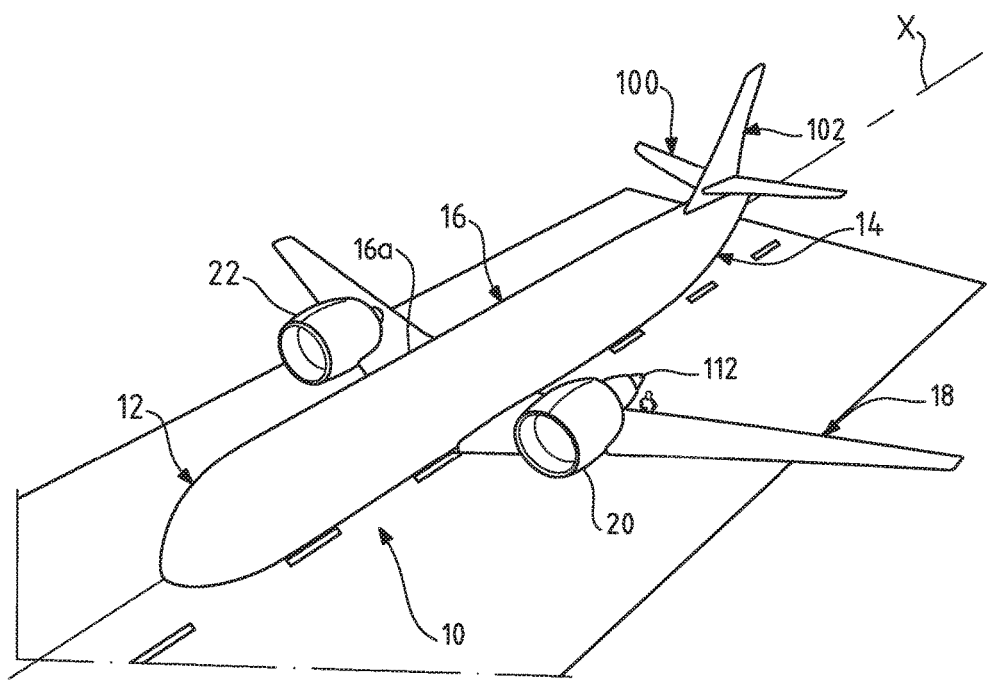
FIG. 1 is an overall perspective schematic view of an aircraft according to one embodiment of the invention.

FIG. 1 shows, in perspective, an aircraft 10 which comprises the following elements arranged along a longitudinal axis X of the aircraft: a nose 12, a tail 14 and, between the two, a central part of the fuselage 16. The aircraft also comprises a central wing structure 18 on which are mounted two engines 20 and 22.

Figure 2:
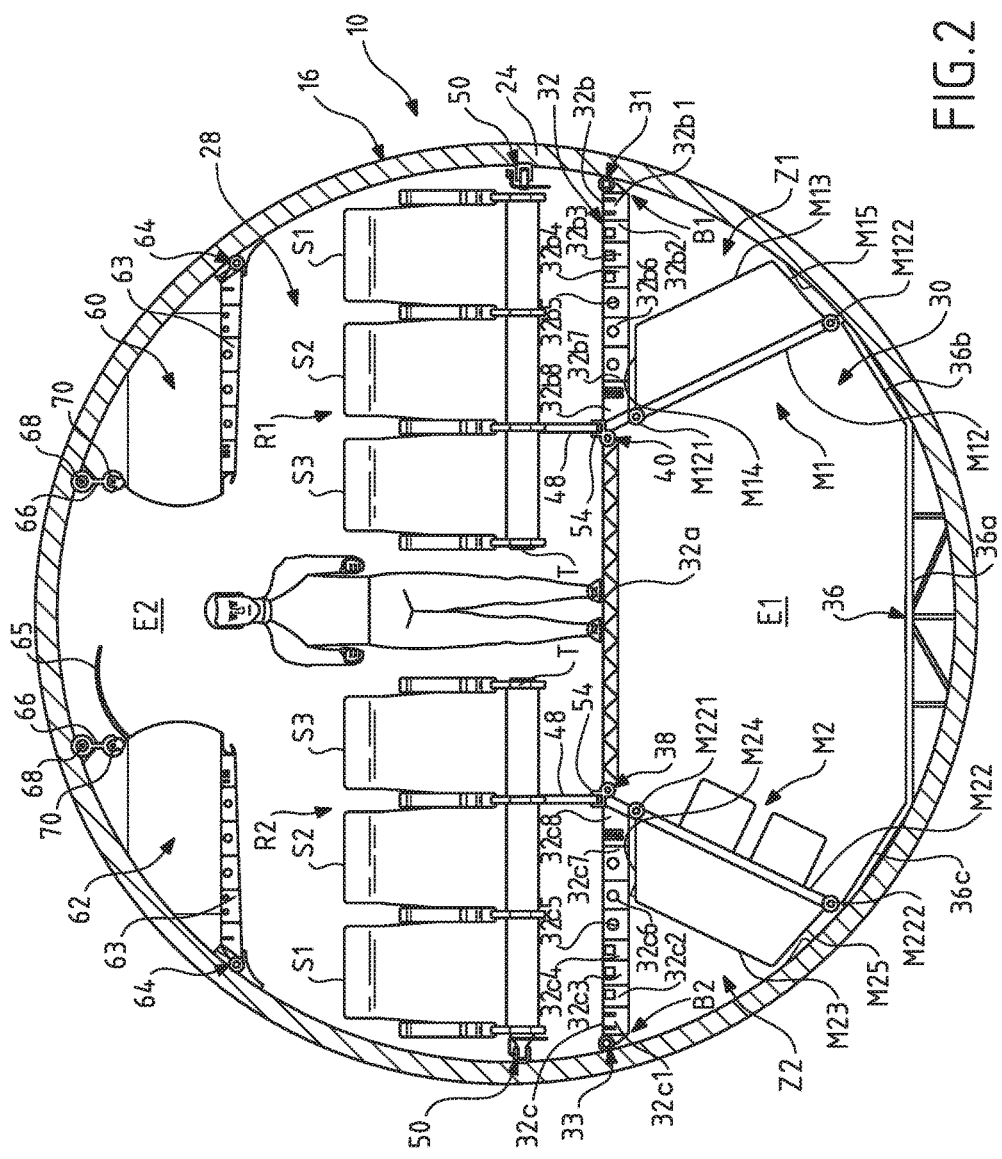
FIG. 2 is a schematic view of a cross section of the aircraft from FIG. 1.

FIG. 2 shows a cross section of the central part of the fuselage 16 which is of constant geometry (does not change) over its entire length (longitudinal axis X) and for example, here, the section is circular. The whole of the central part of the fuselage 16, termed "general section of the aircraft," is thus, for its part, cylindrical. The nose 12 and the tail 14 are, for their part, each of non-constant cross section, that is to say that their cross section changes along the longitudinal axis X.

The figure shows a frame 24 of the primary structure of the fuselage, it being understood that the fuselage comprises, along the longitudinal axis X, a succession of similar frames that are parallel to one another and secured to one another in a known manner.

The central part of the fuselage 16 comprises an upper space 28 and a lower space 30 that are separated from one another by a floor 32. The upper space 28 comprises a cabin equipped with passenger seats while the lower space 30 is a below-cabin space or hold. The hold 30 comprises a hold floor 36 which is arranged in the lowest portion of the cross section and is parallel to the floor 32. The floor 32 serves as a ceiling for the hold and extends over the entire length of the central part 16 (along the longitudinal axis X of the aircraft in FIG. 1). The hold floor 36 comprises a horizontal portion 36a framed by two symmetric inclined floor portions 36b, 36c which follow the rising profile of the adjacent walls of the fuselage.

The floor 32 comprises a central portion 32a framed by two lateral portions 32b, 32c which, for example, each form a one-piece module over the entire length of the central part 16.

The central portion 32a is a hollow box provided with longitudinal channels which provide structural reinforcement.

The left-hand lateral floor portion 32b and the right-hand lateral floor portion 32c are fixed respectively to two mutually facing opposite internal lateral edges of the fuselage B1, B2. The edges B1, B2 are equipped with attachment elements which will engage with respective complementary attachment elements of the lateral portions 32b, 32c to form, in a known manner, a respective articulated connection 31, 33. The procedure of latching the attachment elements to one another is for example carried out manually.

The central floor portion 32a is broken up, along the longitudinal axis of the central fuselage part, into multiple longitudinal floor segments, each having a length which is less than the total length of the central fuselage part. The longitudinal floor segments, once in place, form a continuous central floor portion. Each central floor segment 32a, such as that shown in FIG. 2, comprises, at its two opposite ends, attachment elements which are engaged with complementary attachment elements fitted to the respective free ends of the two lateral floor portions 32b, 32c. The engagement between the mutually complementary attachment elements forms, on one hand, an articulated connection 38 between the central portion segment 32a and the lateral portion 32c and, on the other hand, a connection 40 between the central portion segment 32a and the lateral portion 32b. The connection 40 is such that it allows a possible transverse movement (in the plane of the floor, specifically here in a horizontal plane) between the two connected portions 32a, 32b. The connection is a sliding connection, for example created by means of a pin which is able to slide within an oblong hole. This arrangement is useful in the context of the deformation under pressure of the circular-cross section fuselage, as shown in FIG. 3 by the various arrows. Pressurization of the fuselage (radial arrows inside the fuselage) causes the interconnected lateral portion 32c and central portion 32a to move away from the other lateral portion 32b, such that it is possible for no tensile mechanical loads to be applied to the central portion 32a.

As shown in FIG. 2, each lateral floor portion 32b, 32c forms a box divided into multiple parallel hollow compartments, elongate along the longitudinal axis of the aircraft (perpendicular to the figure) and separated. The compartments $32b1$-$32b8$ and $32c1$-$32c8$ each house bundles of electric cables, air supply and removal ducts which are connected to the various aircraft systems and equipment such as control or power components and systems, connected to the electrical network (electrical master boxes, avionics cabinets, air or water management cabinets).

The central part of the fuselage 16 comprises, beneath each lateral floor portion 32b, 32c, a plurality of cabinets arranged along the longitudinal axis of the aircraft, one beside the other.

These cabinets are distributed in the hold 30 along two parallel lines on either side of a longitudinal central free space E1 which is designed to receive, in particular, a plurality of cargo containers.

FIG. 2 shows schematically two cabinets M1 and M2, facing one another, that are separated from one another by the central space E1 and which obscure, following the longitudinal alignment, other cabinets which are for example identical (same housing volume and same space requirement) arranged in a plane behind that of FIG. 2.

The cabinets thus distributed bring together, respectively, two sets of electric and/or electronic systems, and/or of air-conditioning and ventilation systems, and/or of water distribution and recovery systems and/or of avionics systems. These systems were, beforehand, in general dispersed in the lower space located beneath the floor in dedicated technical zones (air zone, hydraulic zone, electric zone, etc.).

As shown in FIG. 2, the two cabinets M1, M2 are mounted in two lateral zones Z1, Z2 located respectively beneath the lateral floor portions 32b, 32c.

The lateral zones Z1, Z2 extend longitudinally from one end of the cargo hold to a central zone 16a of the central part 16 (FIG. 1) at which the wing structure 18 is connected to the fuselage, then resume after this interruption due to the zone 16a, extending longitudinally to an opposite end of the cargo hold located at the tail 14.

Each cabinet has, as seen in cross section, for example, a trapezoidal general shape. The trapezoidal general shape of the cabinet M1 (or M2) is formed, on one hand, by two mutually parallel large faces M12, M13 (or M22, M23) and, on the other hand, by two small faces M14, M15 (or M24, M25) inclined towards one another and adjacent to the large faces. For the purposes of the following explanation, the mutually parallel large faces M12, M13 (or M22, M23) are respectively termed front and rear faces. The front face M12 (or M22) is that face of the cabinet which is located facing the central space E1, while the rear face M13 (or M23) is the opposite face, located behind the cabinet with respect to the central space.

The cabinets M1, M2 each have their respective front face M12, M22 located facing the central space E1 and inclined in the direction of this central space such that the respective upper end M121, M221 of the front face is closer to said central space than the lower end M122, M222 set back from said front face.

The lateral faces M14 (upper face), M15 (lower face), M24 (upper face), M25 (lower face) of the respective cabinets M1, M2 are shaped so as to be as close as possible respectively to the lateral floor portions 32b and 32c and to the adjacent lower walls of the fuselage in the hold 30. The cabinets thus have contours in cross section which closely match, at least in part, the contours of each zone Z1, Z2 of triangular cross section.

Each cabinet M1, M2 is fixed by the upper and lower ends of its front face M12, M22 respectively at the free end of the lateral floor portion located above and at a lower edge of the fuselage located below the lateral floor portion, set back with respect to the projection formed by the end of said lateral portion which is connected to the central portion 32a.

As shown in FIG. 4, the front face of each cabinet (such as the cabinets M2) comprises two parallel elongate elements 11, 12, such as rods, framing a central panel p. The elements 11, 12 are mounted each articulated on upper and lower longitudinal bars b1 and b2, via their opposite ends M121, M122, M221, M222 fixed respectively to the lower face of the floor 32 and to the lower wall of the fuselage using known techniques. The lower ends M122 and M222 of the cabinets are articulated via articulated connections of known type (clevis, tenon and pin). The upper ends of the cabinets M121 and M221 are, for their part, articulated such that the articulation can open so as to cause the cabinet to pivot downwards, as shown in FIG. 4. For example, the tenon used for the upper articulation of the cabinet is configured in the form of a hook or a carabiner so as to be able to open and close as required.

The cabinets are able to tip downwards (see FIG. 4, one of the cabinets M2 is removed from its housing and rests on the central portion 36a) in order to carry out various procedures and, in particular, gain access to the space of the lateral zone Z2 located behind the cabinet.

In the service position (not lowered), the elements 11, 12 serve as oblique force-transmitting elements between the lateral floor portions 32b, 32c and the lower edges of the fuselage. The cabinets are thus able to support the lateral floor portions via their structural uprights.

The central space E1 has, as seen in FIG. 2, a polygonal shape formed by bringing together two trapeziums joined at their respective bases. The contours of this space follow the profile of the lower face of the central floor portion 32a, the front faces of the cabinets M1, M2, the inclined lateral portions 36b, 36c of the hold floor and the central horizontal portion 36a.

The hold 30 may thus accommodate cargo containers whose general cross section shape corresponds to the general polygonal shape of the central space E1 so as to occupy all of the possible available space.

The passenger cabin 28 comprises, above each lateral floor portion 32b, 32c, a plurality of rows of passenger seats parallel to one another (FIG. 2 shows a single row R1 arranged above the portion 32b and a single row R2 above the portion 32c, while multiple rows are partially visible in FIG. 4). The passenger seats (for example three: S1, S2, S3) of each row or set are all mounted on a common tube T of longitudinal (horizontal) extent parallel to the floor 32. The large-diameter tube T is fixed to the corresponding lateral floor portion 32b, 32c by a single common foot 48 for all the seats. The tube T is also fixed to the adjacent fuselage wall, in particular to one of the frames 24 of the primary structure, by means of a lateral attachment assembly 50. This is for example an attachment assembly of a type known per se, such as that used in conventional aircraft for attaching the seats to the floor (specific seat rails and seat attachments).

The single foot 48 of each row of passenger seats is fixed to an attachment element 54 of a free end of the lateral floor portion 32b, 32c (each free end of the lateral floor portion is fixed to the central floor portion 32a) so as to transmit the vertical forces passing through the foot through the oblique force-transmitting elements 11, 12 of the cabinets. As a variant, the force-transmitting elements 11, 12 may be arranged not obliquely but vertically, the cabinets being then vertical and not inclined in the direction of the central space. It is to be noted that behind each foot (FIG. 4) there is an oblique rod 52 for supporting the foot, which acts as a buttress between the foot and the floor.

As shown in FIG. 5, the path taken by the vertical forces F1 to F3 (forces along the Z axis) representing the accelerated mass of the passengers seated in their seats is direct since it passes directly through the foot 48 and the structural lateral uprights 11, 12 of the cabinets M2 to the frames of the fuselage 24. Thus, the lateral floor portions 32b 32c participate only to a very limited degree in transmitting the vertical forces. In FIG. 5, the forces have been shown only for the row of seats R2 but they apply in the same manner for the row of seats R1 and the cabinets M1.

The central fuselage part comprises, in the upper space 28 located above the rows R1, R2 of passenger seats (FIG. 2), two sets 60, 62 of lateral overhead storage compartments which are arranged on either side of a central free upper space E2 and are fixed to the fuselage (frames). The lateral overhead storage compartments of each set 60, 62 are arranged along the longitudinal axis of the aircraft, one behind the other. Each set of compartments forms for example a one-piece module which comprises a common bracket 63 which supports the compartments and is fixed to the fuselage by an attachment arrangement 64 of the clevis, tenon and connection pin type. The common bracket 63 for all the compartments is a hollow box which is elongate over the entire length of the central part 16 and houses, in cavities which may or may not be separate, electric cables and various electrical, aeraulic, hydraulic or other connection elements. The arrangement and the nature of the elements housed in the hollow box of the brackets 63 are identical to those of the lateral floor portions 32b and 32c but the equipment and systems connected to these elements are generally arranged in the upper part of the upper space 28. It is also to be noted that the hollow boxes of the brackets 63 may be used to house cables having the same function (for redundancy purposes) as the cables housed in the lateral floor portions 32b, 32c located in the lower part. Separating the cables having the same function between the upper part and the lower part of the upper space 28 reduces the risk of simultaneous damage to the same cables.

The compartments are fixed to their upper part by upper connecting rods 66 which each connect, to each other, the attachment elements 68 (e.g. fittings) of the fuselage and the attachment elements 70 of the compartments.

A door 65 for access to the interior of each compartment is shown in the open position in FIG. 2.

This creates an isostatic mounting (in the plane of the cross section), which accommodates the deformations of the fuselage caused by pressurization of the latter, as well as mechanical loads during flight.

FIG. 6 shows the internal configuration of the aircraft 10 and shows that the general section of the aircraft (central part 16 of constant cross section) is exclusively filled with seats for passengers from one end to the other of this section (internal configuration continuous for each class). The seats are arranged in rows R1, R2 in accordance with the above description, although another geometric arrangement is entirely possible. Only two symmetric lateral openings O1, O2 are arranged, in order to receive emergency exits, and locally modify the positioning of the rows of seats and their spacing in the longitudinal direction (X). These emergency exits are formed by fuselage panels which are smaller than a door and which each include a window. These panels are unlocked and ejected outside the aircraft so as to allow access if required.

As shown in FIG. 6, the tail 14 houses a galley 90 comprising a zone 92 housing various equipment and installations such as taps, microwave ovens, equipment for the storage and distribution of drinks and a zone 94 receiving a set of passenger trolleys. The tail 14 has a non-constant geometric cross section which contracts from the zone 14a at which it connects to the rear end of the general section 16 to the zone that includes its terminal end 14b (the narrowest zone). Zone 92 is arranged in the widest zone of the tail, close to the general section. Lateral openings O3, O4 provided with doors for passengers and crew to board and disembark are arranged between zone 92 and the rear end of the general section 16. Zone 94 is positioned towards the rear of the tail, where the width of the cross section is smaller and smaller.

There is just one galley 90 for the entire aircraft, such that the central part of the fuselage 16 can be reserved for accommodating the passengers.

In order to allow this extension of the cabin arrangement into the tail, the conventional structure of the tail has been modified: the horizontal empennage 100 (FIG. 7) of the aircraft, which is usually positioned so as to pass through the two opposite sides of the tail, is here moved up to the root of the vertical stabilizer 102, above that region of the vertical stabilizer which connects to the tail 14.

The tail 14 is now part of the pressurized zone.

As shown in FIG. 7, the trolleys 104 are housed in one or more compartment cabinets 95 of the zone 94 which extends to the rear, beneath the two symmetric parts 100a, 100b of the horizontal empennage 100. That zone of the tail 14 which is located beneath part 100b of the empennage (in the background) and is not visible in FIG. 7 houses other galley equipment and/or trolleys 104.

The aircraft has a novel external configuration which is shown in FIGS. 8, 10 and 11, in which:
- the main landing gears 110 are mounted in aerodynamically profiled bays (fairings 112) which are fixed to the wing structure of the aircraft in a manner which is known;
- the wing structure 18 is lowered and connected to the belly 16a of the central part 16 of the aircraft, which has no bays for the main landing gears;
- the low wing structure 18 is an integral wing structure and not a three-part wing structure as in the prior art;
- the engines 20, 22 are attached above the wing structure of the aircraft by means of pylons (not shown) respectively on the wings 18a and 18b in a manner which is known (in FIG. 10 the engines have been deliberately moved away from the wing structure for the sake of clarity).

By way of comparison, FIG. 9 shows a conventional aircraft configuration 150 in which:
- the wing structure 152 is connected to the belly fairing 154 of the central part and is higher than the wing structure in FIG. 8;
- the engines 156, 158 are attached below the wings 160, 162;
- the main landing gears 164, 166 (of which only the wheels have been shown, in contact with the ground) are housed in bays (not shown) which are located in the belly fairing 154;
- the empennage 168 is mounted such that it passes through the tail of the aircraft, without being connected to the root of the vertical stabilizer 170.

As shown in FIG. 11, the imaginary envelope which surrounds the wing structure 18 on which are mounted the engines 20, 22 and the landing gear 110 as well as their bays 112 may constitute a single module which is installed on the fuselage of the aircraft, in the final phase of assembly, from below. Alternatively, the wing structure is installed from below the fuselage and the engines and landing gear are then mounted on the wing structure.

It is to be noted that the circular cross section of the aircraft of the embodiment of the invention proves simpler to produce and more stable under the effects of the internal overpressure (homogeneous deformation of the fuselage) than a four-lobed shape of the prior art.

Since the central floor portion 32a is connected on one hand to one of the two lateral floor portions 32b, 32c by a connection in which one of the two connecting parts is free to move transversely, the central floor portion is not loaded mechanically when the fuselage is pressurized.

The central floor portion 32a is broken up, in the longitudinal direction, into longitudinal segments in order to simplify its installation at the end of fitting out the cabin. This configuration also allows operatives to intervene more easily by removing a segment at the location where intervention is necessary without having to remove the entire central portion. Operatives can thus remain upright, which improves their working conditions.

Moreover, integrated into the thickness of the segments, inside the longitudinal channels or cavities, can be all or part of the ventilation for the hold 30 and/or provision for circulating a fire-extinguishing gas in the event of a fire in the relevant zone.

It is to be noted that the circular cross section frees up more space in the hold (below-cabin space) than a four-lobed shape of the prior art.

Since the central floor portion 32a is not "active," in contrast to the prior art, this floor can be less thick, thus making it possible to increase the height of the cargo containers (the shape of which corresponds to the polygonal shape of the central space E1 (FIG. 2)).

The reconfiguration of the hold 30 makes it possible to eliminate the specific technical zones of the prior art and to group all or almost all of the systems in the cabinets located in the lateral zones Z1, Z2 (lower triangular zones). The various electric, aeraulic and hydraulic connections (not shown) required for the systems housed in the cabinets extend in the longitudinal direction in these zones, for example between the cabinets and the adjacent fuselage wall facing them. For example, these cabinets all have an identical external architecture and identical means of connection with the lateral floor portions and the fuselage frames, which considerably simplifies their installation and the internal arrangement of the hold (two-line architecture). Furthermore, each cabinet may be assigned to any system: electric, aeraulic and hydraulic.

Creating each of the lateral floor portions 32b, 32c and each set of upper lateral compartments 60, 62 in a single module, the length of which is the same as or less than that of the general section 16 of the aircraft, simplifies considerably the phase of assembling the aircraft and thus the assembly time.

As shown in FIG. 6, the fuselage central part 16 with a cross section of constant geometry is also simplified in terms of its internal arrangement, filling as much as possible the space in a uniform manner with passenger seats, positioning the boarding doors as far as possible to the forward and rear ends of this part, and removing the galley 90 from this part (the galley is concentrated in the tail 14). The emergency exits described above are designed so as not to disrupt the internal arrangement.

The zone reserved for passengers is thus as long as possible.

As shown in FIGS. 8, 10 and 11, the external architecture of the aircraft with the engines 20, 22 and the landing gear 110 as well as their bays 112 on the wing structure makes it possible to simplify the structure of the central fuselage part 16.

Indeed, the presence (as in the prior art) of a central landing gear bay in the fuselage creates a zone which is complex both in structural terms (a zone which is subject to large loads and is not pressurized) and in terms of integrating the equipment necessary for operation of the landing gear.

Also, the majority of aircraft include a specific aerodynamic fairing (the belly fairing 152 in FIG. 9) in order to shroud the landing gear. Such a fairing incurs a penalty in terms of mass and cost as well as aerodynamics.

Arranging the landing gear and their bays on the wing structure does away with this fairing (FIGS. 8, 10 and 11).

Arranging the engines above the wings, and not having to integrate the landing gear into the fuselage, together make it possible to lower the wings, as can be seen from a comparison of FIGS. 8 and 9. The lowered wing structure has a reduced dihedral, being relatively flat, thus bringing the aircraft closer to the ground.

As a consequence, the landing gear can be shorter than hitherto (FIG. 9), and thus simpler and more lightweight. Moreover, a ground effect during landing and take-off phases can be observed (increased lift).

The lowered wings also make it possible to install the wing structure in the final phase from underneath the fuselage instead of installing each half of the wing structure on the central wing box.

This arrangement makes it possible to create an integral (one-piece) primary wing structure.

It is to be noted that installing the engines above the wings offers the advantages of:
significant reduction in the length of the landing gear,
the possibility of installing large engines with the associated effects such as improved performance, reduced noise, additional sound masking during approach, and safer emergency landing or ditching,
reduction in the length of the evacuation slides (or even elimination thereof in the case of small aircraft).

It is to be noted that the system for deploying slats and flaps is delocalized and uses, in a manner which is known, electro-hydraulic actuators associated with a system of sensors (emitters and receivers of electromagnetic signals) and targets (reflecting towards the receivers the signals emitted by the emitters) in order to synchronize the movement of the lift-increasing elements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a fuselage having a central part with a cross section of constant geometry and which comprises a floor, the floor comprising:
two lateral portions which are fixed respectively to two opposite lateral edges of the fuselage and which enclose a central portion to which the two lateral portions are fixed,
one of the two lateral floor portions being fixed to the central portion so as to allow a relative lateral movement between the two portions in the event of a modification in pressure inside the fuselage without transferring mechanical loads from the one of the lateral floor portions of the central portion.

2. The aircraft according to claim 1, wherein the fuselage comprises, arranged in succession along a longitudinal axis of the aircraft, a nose, the central part with a cross section of constant geometry and a tail, the nose and the tail being each of non-constant cross section.

3. The aircraft according to claim 1, wherein the central part has a circular cross section.

4. The aircraft according to claim 1, further comprising, for each lateral floor portion, arranged along a longitudinal axis of the aircraft, a plurality of force-transmitting elements which extend between each lateral floor portion and the fuselage, each force-transmitting element extending obliquely from an end of a lateral floor portion fixed to the central floor portion to a lower edge of the fuselage located beneath the lateral floor portion and set back with respect to a projection formed by the end of said lateral floor portion.

5. The aircraft according to claim 1, further comprising, above each lateral floor portion, a plurality of rows of passenger seats, the passenger seats of each row being mounted on a common tube whose longitudinal extent is parallel to the floor, the tube being itself fixed to the corresponding lateral floor portion by a single foot.

6. The aircraft according to claim 4, further comprising, above each lateral floor portion, a plurality of rows of passenger seats, the passenger seats of each row being mounted on a common tube whose longitudinal extent is parallel to the floor, the tube being itself fixed to the corresponding lateral floor portion by a single foot.

7. The aircraft according to claim 6, wherein the single foot of each row of passenger seats is fixed at the end of the lateral floor portion which is fixed to the central floor portion so as to transmit the vertical forces passing through said foot through the force-transmitting elements located beneath the floor.

8. The aircraft according to claim 1, wherein the central part is reserved for receiving passenger seats.

9. The aircraft according to claim 1, further comprising, integrated into the lateral floor portions so as to extend longitudinally in the central part of the aircraft, bundles of electric cables and air supply and removal ducts.

10. The aircraft according to claim 1, wherein the one of the two lateral floor portions is slideably fixed to the central portion.

11. The aircraft according to claim 10, wherein both lateral floor portions are slideably fixed to the central portion to allow a relative lateral movement between the two portions in the event of a modification in pressure inside the fuselage without transferring mechanical loads from the lateral portions to the central portion.

12. The aircraft according to claim 11, wherein the two lateral floor portions are each slideably fixed to the central portion via a sliding connection comprising a pin within an oblong hole.

13. The aircraft according to claim 10, wherein the one of the two lateral floor portions is slideably fixed to the central portion via a sliding connection comprising a pin within an oblong hole.

14. The aircraft according to claim 1, wherein each lateral floor portion comprises a box divided into multiple parallel hollow compartments.

* * * * *